J. W. KELLBERG.
Churn.
No. 30,409.   Patented Oct. 16, 1860.
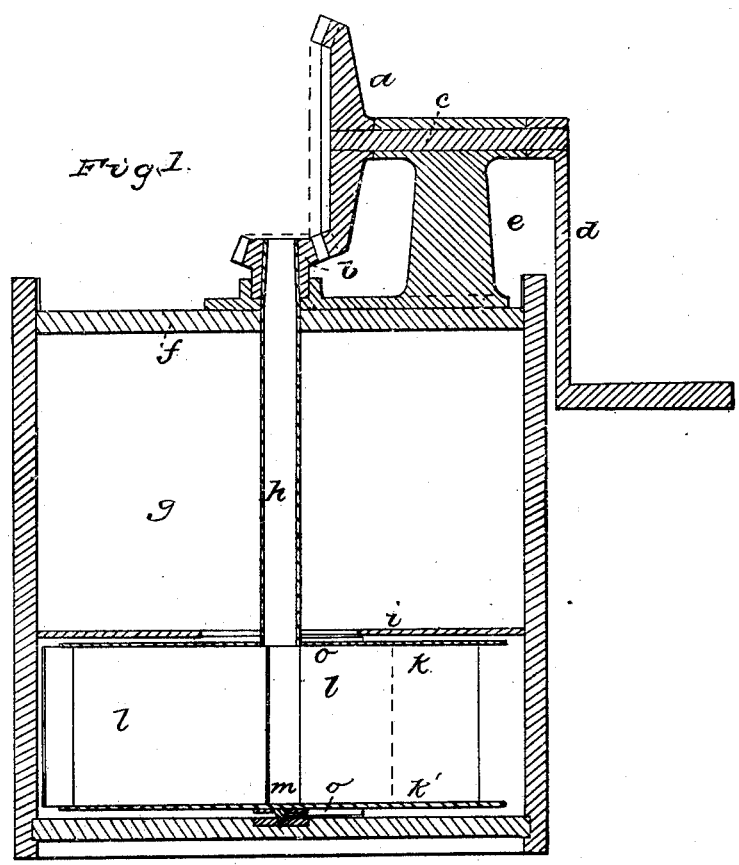
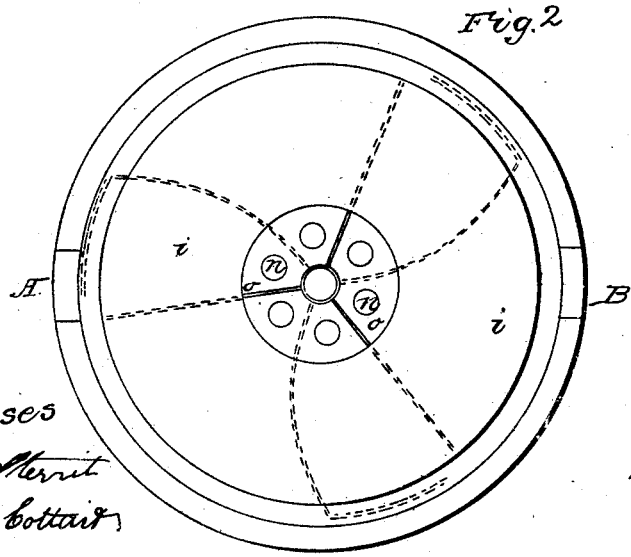
Witnesses
Wm B Merrit
William Cottait
Inventor
John W Kellberg

UNITED STATES PATENT OFFICE.

JOHN W. KELLBERG, OF PITTSBURG, PENNSYLVANIA.

CHURN.

Specification of Letters Patent No. 30,409, dated October 16, 1860.

*To all whom it may concern:*

Be it known that I, JOHN W. KELLBERG, of the city of Pittsburg, in the county of Allegheny and State of Pennsylvania, have invented certain new and useful Improvements in Churns; and I do hereby declare that the following is a full and exact description thereof.

I am aware that quite a variety of plans have been devised, for causing air to pass through the cream during the process of churning; I am also aware that plans have been invented for rubbing the butter out—or churning by friction;—and I am of the opinion that the old vertical dasher churn embodied both of these principles, but very imperfectly. In my invention I have endeavored to carry out this idea in the most simple form possible, and I hope it will do no harm for me to state here, that I have made a churn on this plan, which will complete a churning in from four to six minutes.

Figure 1 is a sectional view of my churn. Fig. 2 is a plan view of the same with the lid removed.

The same letters refer to like parts on both drawings.

$a$ is a bevel wheel driving the pinion $b$, and hanging on shaft $c$, to be operated by crank $d$; $e$ is a stand for the bearings of shaft $c$; $g$ is the body of the churn, and $f$ is the lid of it; $h$ is a tubular shaft terminating with plate $k$, and plate $k$ is connected with plate $k'$ by three curved wings or paddles $l, l, l$. Said paddles are continued a portion off and on a line nearly parallel with the circumference of the churn.

$i$ is a disk with an opening in its center, intended to form a barrier for the cream to be thrown against, forming a friction surface like the bottom of the churn. Said disk $i$ should be fastened to prevent it from revolving.

$n, n,$ are openings through plate $k$, to allow the cream to flow back into the body of the centrifugal dasher, and also to afford an additional supply of air.

$m$ is a step or center upon which the said dasher revolves.

$o, o,$ are ribs on the top of plate $k$ and bottom of $k'$.

The operation of my churn may be described thus, viz: When the shaft $h$ is made to revolve quickly the curved wings cause the cream to be thrown from the center to the circumference of the churn with so much force as to create a large amount of friction when it is being pressed between the wing or dasher extensions and the sides of the churn, and at the same time a strong current of air is carried through the body of the cream, and any cream that is forced out over the disk $i$, flows back into the center to be worked over.

What I claim as new and desire to secure by Letters Patent, is—

The dasher and disk, made and operating substantially as described.

JOHN W. KELLBERG.

Witnesses:
D. A. MORRIS,
I. DONALDSON.